(12) United States Patent  (10) Patent No.: US 7,672,868 B1
Keller et al.  (45) Date of Patent: Mar. 2, 2010

(54) CREATING AN INCENTIVE TO AUTHOR USEFUL ITEM REVIEWS

(75) Inventors: Thomas L. Keller, Renton, WA (US); Jon Phillips, Seattle, WA (US); Nicolas Pottier, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 12/201,678

(22) Filed: Aug. 29, 2008

Related U.S. Application Data (62) Division of application No. 11/342,173, filed on Jan. 27, 2006, now Pat. No. 7,428,496, which is a division of application No. 09/842,265, filed on Apr. 24, 2001, now abandoned.

(51) Int. Cl.
*G06F 17/30* (2006.01)
(52) U.S. Cl. ........................................ 705/10
(58) Field of Classification Search ................ 705/10, 705/26
See application file for complete search history.

(56) References Cited

U.S. PATENT DOCUMENTS

| | | | |
|---|---|---|---|
| 6,185,558 B1 | 2/2001 | Bowman et al. | |
| 6,223,165 B1 * | 4/2001 | Lauffer | 705/8 |
| 6,260,064 B1 | 7/2001 | Kurzrok | |
| 6,275,811 B1 | 8/2001 | Ginn | |
| 6,513,033 B1 | 1/2003 | Trauring | |
| 6,895,385 B1 | 5/2005 | Zacharia et al. | |
| 7,346,536 B2 * | 3/2008 | Kubota | 705/10 |
| 7,433,832 B1 * | 10/2008 | Bezos et al. | 705/26 |
| 2002/0165905 A1 | 11/2002 | Wilson | |
| 2004/0210550 A1 | 10/2004 | Williams et al. | |

FOREIGN PATENT DOCUMENTS

WO  WO 03/034637  4/2003

OTHER PUBLICATIONS

Wyner, Gordon A., "Life (on the Internet) Imitates Research." Marketing Research, vol. 12, No. 2, p. 38, Summer 2000.*

"Home, Netscape, Yahoo! Veterans Announce Epinions.com," PR Newswire, p. 8921, Jul. 12, 1999.

"Epinions.com Announces the Launch of its Free Online Shopping Guide Powered by Consumer Opinions," PR Newswire, p. 2829, Sep. 8, 1999.

Tedeshi, Bob, "Consumer Products are Being Reviewed on More Web Site, Some Featuring Comments from Anyone with an Opinion," New York Times, Section C, p. 16, Col. 1, Oct. 25, 1999.

(Continued)

*Primary Examiner*—Susanna M Diaz
(74) *Attorney, Agent, or Firm*—Knobbe, Martens, Olson & Bear LLP (57) ABSTRACT

A facility for rewarding the provision of useful item reviews is described. The facility receives a plurality of item reviews, each from a source. The facility publishes each of the plurality of received item reviews, and assesses the usefulness of the published item reviews. Based upon this assessment of usefulness, the facility selects one or more of the published item reviews, and provides rewards to the sources of these selected item reviews.

27 Claims, 11 Drawing Sheets

OTHER PUBLICATIONS

Barrett, Alexandra, "What's Your Epinion?" Network World, Sep. 13, 1999.

Wohl, Amy D., "User Review—Your Opinions Are Highly Valued on the Web," VarBusiness, No. 1528, p. 69, Nov. 8, 1999.

"eBay Launches the Most Comprehensive Trust and Safety Upgrades to the World's Largest Person-to-Person Trading Site." PR Newswire, Jan. 15, 1999.

Lenati, Chuck. "Auction Mania." Upside, vol. 11, No. 7, pp. 84-92, Jul. 1999.

eBay's Feedback Forum web site, archived on Oct. 12, 1999 by web.archive.org [URL: http://web.archive.org/web/19991012065814/pages.ebay.com...].

Austin et al. "Positive and Negative Effects of Political Disaffection on the Less Experienced Voter." Journal of Broadcasting & Electronic Media, vol. 39, No. 2, pp. 215-235, Spring 1995.

* cited by examiner

CREATING AN INCENTIVE TO AUTHOR USEFUL ITEM REVIEWS

CROSS-REFERENCE TO RELATED APPLICATIONS

This application is a divisional of U.S. patent application Ser. No. 11/342,173, filed Jan. 27, 2006, which is a divisional of U.S. patent application Ser. No. 09/842,265, file Apr. 24, 2001 (which is now abandoned), both entitled "CREATING AN INCENTIVE TO AUTHOR USEFUL ITEM REVIEWS" which application is incorporated by reference herein its entirety.

TECHNICAL FIELD

The present invention is directed to the fields of electronic commerce and on-line communities.

BACKGROUND

Web merchants sell items such as products, services, and data via the World Wide Web ("the Web"). Because most items sold by a web merchant result in a profit, measured by the amount by which the item's price exceeds its cost, web merchants have a strong incentive to increase the rate at which they sell items.

It is common for web merchants to design their web sites to include content that helps to draw interest to the web sites and to particular items in order to increase the number of customers that may buy these items. As one example of such content, some web merchants include item reviews on their web sites, which typically provide additional information about an item and, in the case of a positive review, an endorsement of the item. For example, some web merchants furnish book reviews on their web sites.

In some cases, web merchants pay professional reviewers to prepare item reviews. In these cases, the often-significant cost of procuring professional reviews can have a negative impact on the web merchant's profitability. Additionally, some readers of professional reviews may be distrustful of the evaluation of a professional reviewer.

In other cases, volunteers, such as customers, are solicited to prepare item reviews. While volunteer reviews can be procured much less expensively than professional reviews and may have more appeal to readers that prefer reviews from those they perceive to more substantially share their perspective, volunteer review programs often have significant disadvantages of their own.

For example, it can often be difficult to convince volunteers to prepare item reviews. Of those volunteer reviews that are prepared and submitted, a significant portion may be of little use to prospective purchasers for a variety of reasons: such reviews may be poorly written, fail to adequately support their conclusions, contain subject matter irrelevant to the item, engage in ad hominem attacks on the creator of the reviewed item, etc.

In view of the above-discussed disadvantages of conventional types of reviews, a more effective approach to obtaining useful item reviews from volunteers would have significant utility.

BRIEF DESCRIPTION OF THE DRAWINGS

FIG. 6 is a display diagram showing a typical display presented by the facility to enable a user to submit a new review.

DETAILED DESCRIPTION

A software facility for creating an incentive to author useful item reviews ("the facility") is described. In some embodiments, the facility is used by a web merchant to obtain content that, when incorporated in the web merchant's web site, helps to draw interest to the web site and to increase the number of customers that may buy items from the web merchant. The facility provides such an incentive by rewarding the authors of reviews found to be useful by their readers, such as by prominently displaying their names and ranks as authors of useful reviews prominently on the web merchant's web site.

In some cases, review authors (also called "reviewers") submit reviews each relating to a specific item sold by the web merchant. The web merchant displays these reviews to customers in conjunction with the items to which they relate, together with a control—such as buttons—that may be used by viewing customers to vote on how useful the review is to them. For example, in some embodiments, the control enables viewing customers to specify either that they found the review useful or that they did not find the review useful. The facility stores these votes, and periodically uses them to score each reviewer in terms of the number of reviews that the reviewer submitted and their level of usefulness.

Each time new scores are generated, the facility ranks the reviewers in descending order of their scores. These rank values are then typically displayed liberally in conjunction with information about the top-ranked reviewers. For example, the facility may display a list of the top-ranked reviewers, in which the rank of each reviewer is indicated. The facility may also display a shorter list of reviewers randomly selected from among the top-ranked reviewers, such as from the top 100 reviewers. Such displays may include such information as the names of these reviewers, their pictures, and biographical sketches. The facility may display in conjunction with any occurrence of a top-ranked reviewer's name an indication of that reviewer's rank. For example, occurrences of the name of the reviewer having rank 1 may be accompanied by a "#1 Reviewer" message, which the name of the reviewer having rank 89 may be accompanied by a "Top 100 Reviewer" message. Such displays may occur on pages such as a home page for the reviewer, or in conjunction with the reviewer's reviews.

By promoting reviewers that submit reviews that prove to be useful to their readers, the facility motivates many of the users visiting the web merchant's web site to prepare and submit useful item reviews. This in turn typically increases the level of traffic to the web merchant's web site (in terms of number of visitors, average frequency with which a single user visits, and average duration of a visit), the number of sales completed and therefore the profitability of the web merchant, and the level of satisfaction of item purchasers, both with respect to their purchases specifically and with respect to the web merchant generally.

Figure 1:
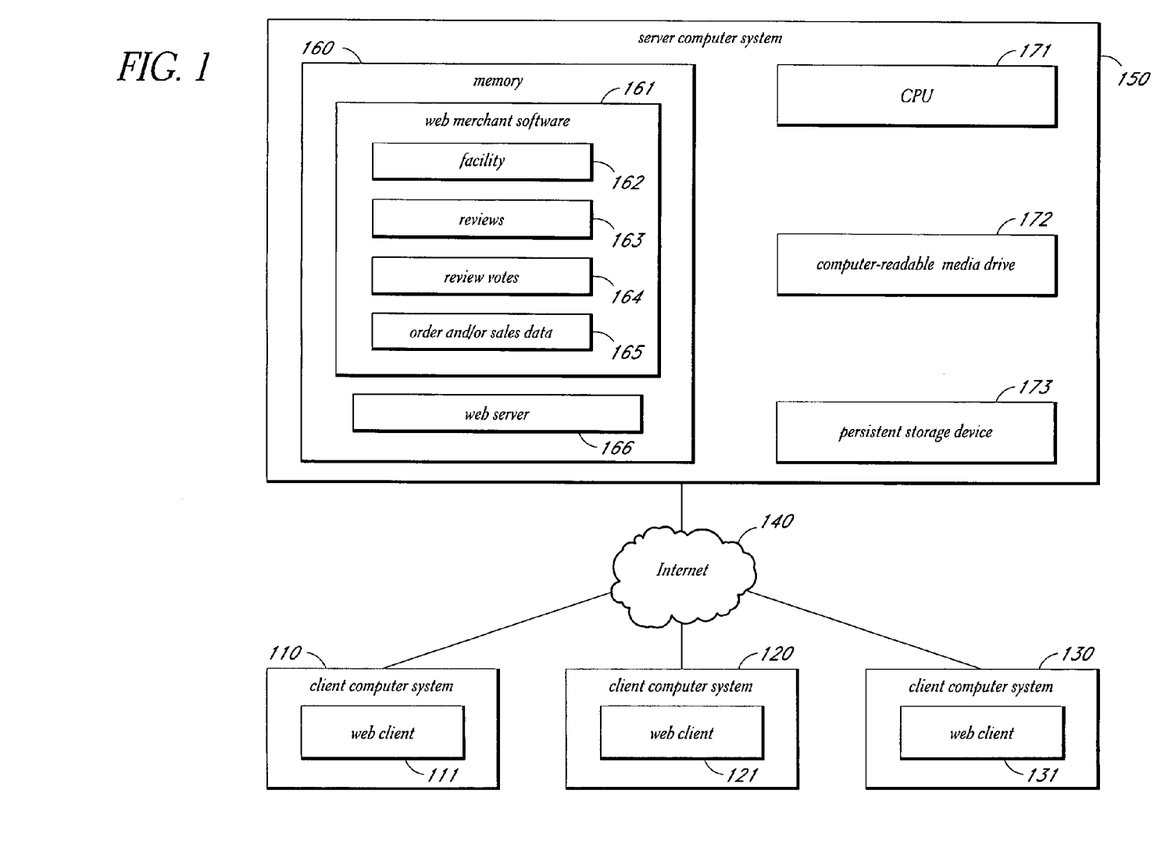
FIG. 1 is a high-level block diagram showing a typical environment in which the facility operates.

FIG. 1 is a high-level block diagram showing a typical environment in which the facility operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains web merchant software 161 incorporating both the facility 162 and data typically used by facility, such as item reviews 163, votes 164 on item reviews, and item order and/or sales data 165. The memory preferably further contains a web server computer program 166 for delivering web pages in response to requests from web clients. While items 161-166 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161, 162, and 166, and a computer-readable medium drive 173 for reading information or installing programs such as the facility from computer-readable media, such as a floppy disk, a CD-ROM, or a DVD.

While various embodiments are described in terms in the environment described above, those skilled in the art will appreciate that the facility may be implemented in a variety of other environments including a single, monolithic computer system, as well as various other combinations of computer systems or similar devices connected in various ways.

Figure 2:
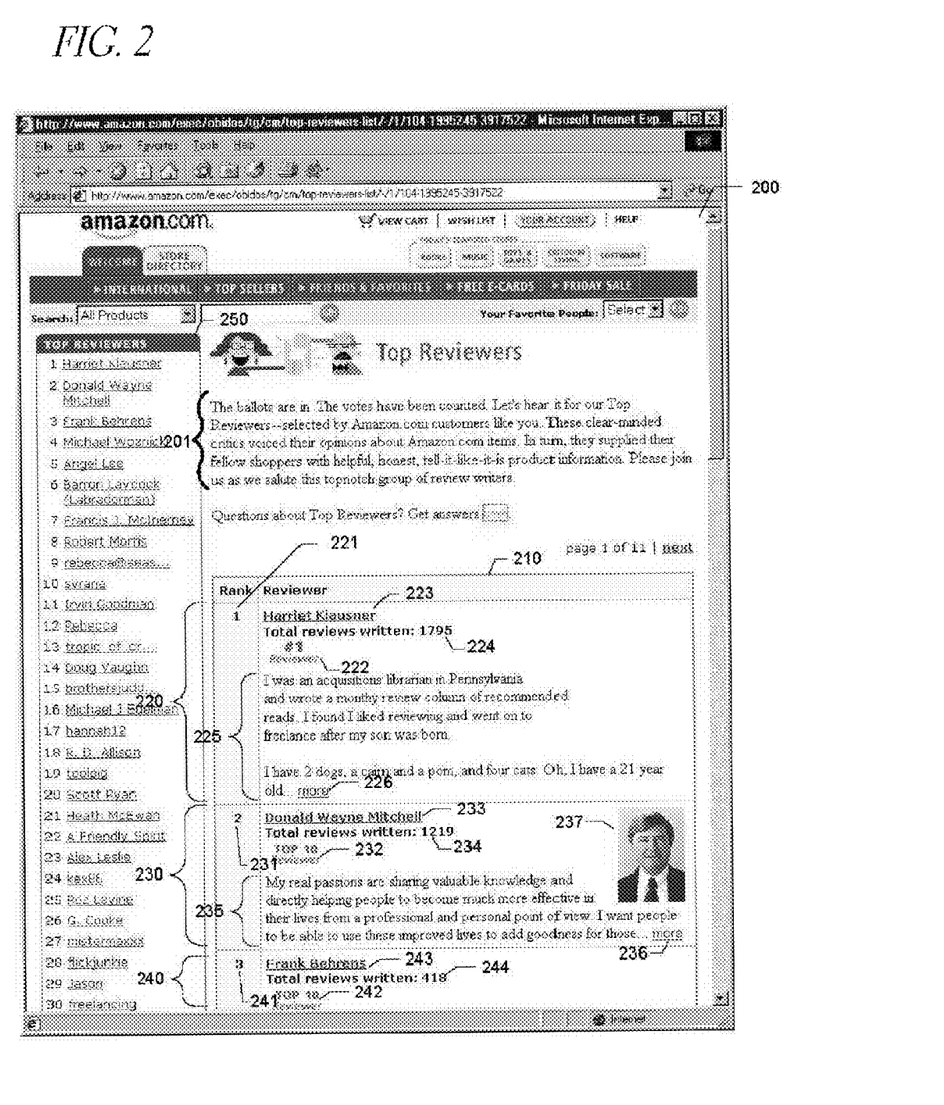
FIG. 2 is a display diagram showing a typical display presented by the facility showing a list of top-ranked reviewers.

FIGS. 2-5 show examples of ways in which the facility promotes, and thereby rewards, top-ranked reviewers. FIG. 2 is a display diagram showing a typical display presented by the facility showing a list of top-ranked reviewers. The display 200 is displayed as part of the web site of web merchant Amazon.com. The display includes to laudatory language 201 congratulating the top-ranked reviewers. The display also includes an ordered list 210 of the top-ranked reviewers. List 210 is comprised of ordered entries, each corresponding to one top-ranked reviewer, such as entries 220, 230, and 240. As an example, entry 220 contains information about the highest-ranked reviewer, Harriet Klausner. This entry contains the reviewer's rank 221, as well as a graphical characterization 222 of the rank. The entry further contains the name of the reviewer 223, which is a link that the user can select in order to view more detailed information about this reviewer. The entry further contains an indication 224 of the total number of reviews authored by this reviewer. The entry also contains further information 225 about the reviewer, typically provided by the reviewer him or herself. This information includes a link 226 that may be selected by the user to display additional information about the reviewer. Some entries contain an image of the reviewer, such as image 237 shown in entry 230.

In addition to the list 210 of detailed entries about the top-ranked reviewers, the display also contains a more abbreviated list 250 of the top-ranked reviewers. In this list, each entry is merely the rank value and the name of the reviewer, which is a link that may be selected by the user to display additional information about the reviewer.

Figure 3:
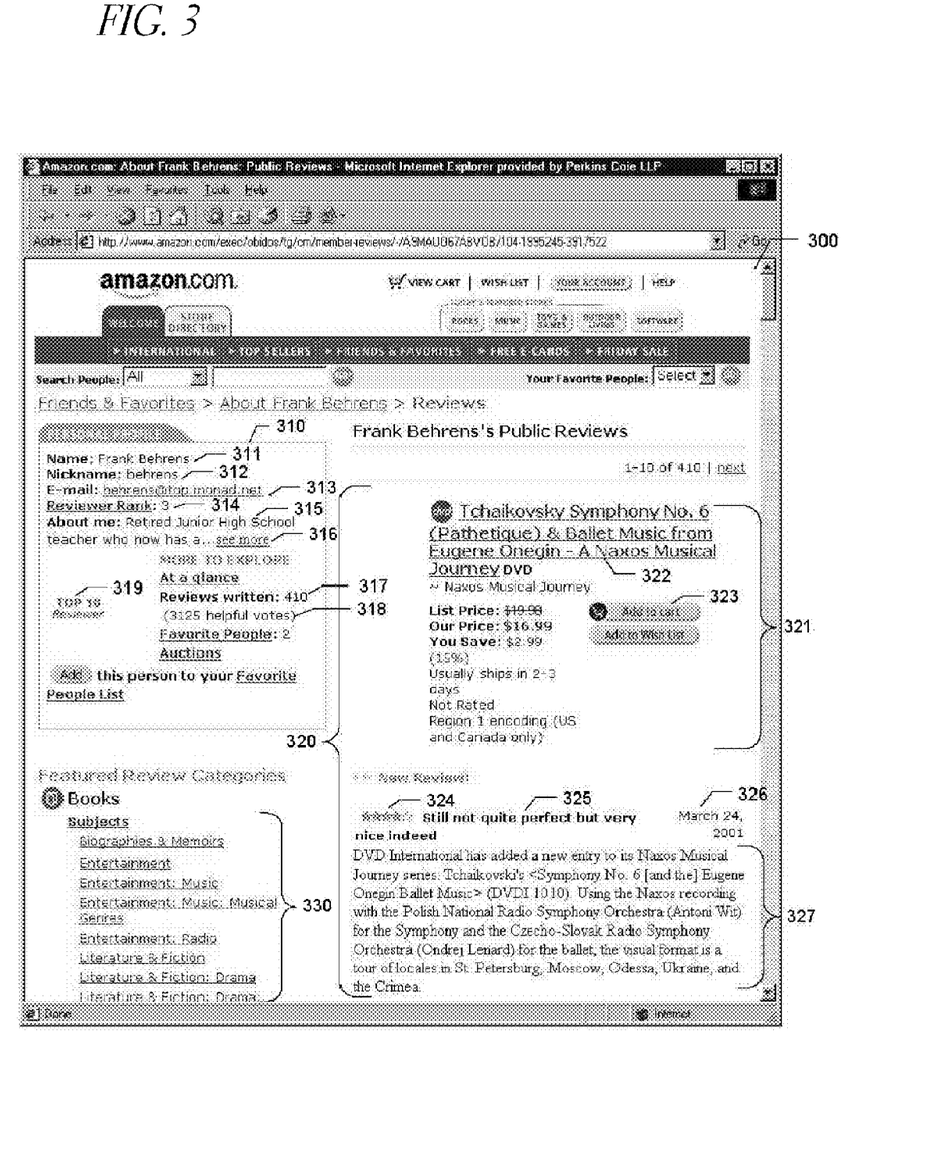
FIG. 3 is a display diagram showing a typical display presented by the facility containing more detailed information about a particular top-ranked reviewer.

FIG. 3 is a display diagram showing a typical display presented by the facility containing more detailed information about a particular top-ranked reviewer. In particular, the display 300 shown in FIG. 3 is displayed by the facility when the user selects link 243 for the reviewer Frank Behrens shown in FIG. 2. The display includes a profile 310 for the reviewer, which include such information as the reviewer's name 311, a nickname 312 for the reviewer, an email address 313 for the reviewer, the current rank 314 of the reviewer, the beginning of a biographical sketch 315 of the reviewer, a link 316 to the entire biographical sketch of the reviewer, a count 317 of the number of reviews submitted by this reviewer, a count 318 of the number of positive votes cast for the reviews of this reviewer, and a graphical indication 319 of the rank of the reviewer. The display further contains each of the reviews submitted by the reviewer. As an example, the display contains information 320 about the reviewer's most recent review. This information includes information 321 about the reviewed item, such as the title, artist, format, price, and availability of the item, as well as a link 322 that may be used to display more information about the item, and a control 323 that may be used to place an order for the item. The information 320 also includes a grade 324 assigned by the reviewer to the item as part of the review—here the grade shown is four stars out of five stars; the review's title 325; the date 326 on which the review was submitted; and the text 327 of the review. The display also contains a section 330 containing links to item categories for which the reviewer has submitted reviews.

Figure 4:
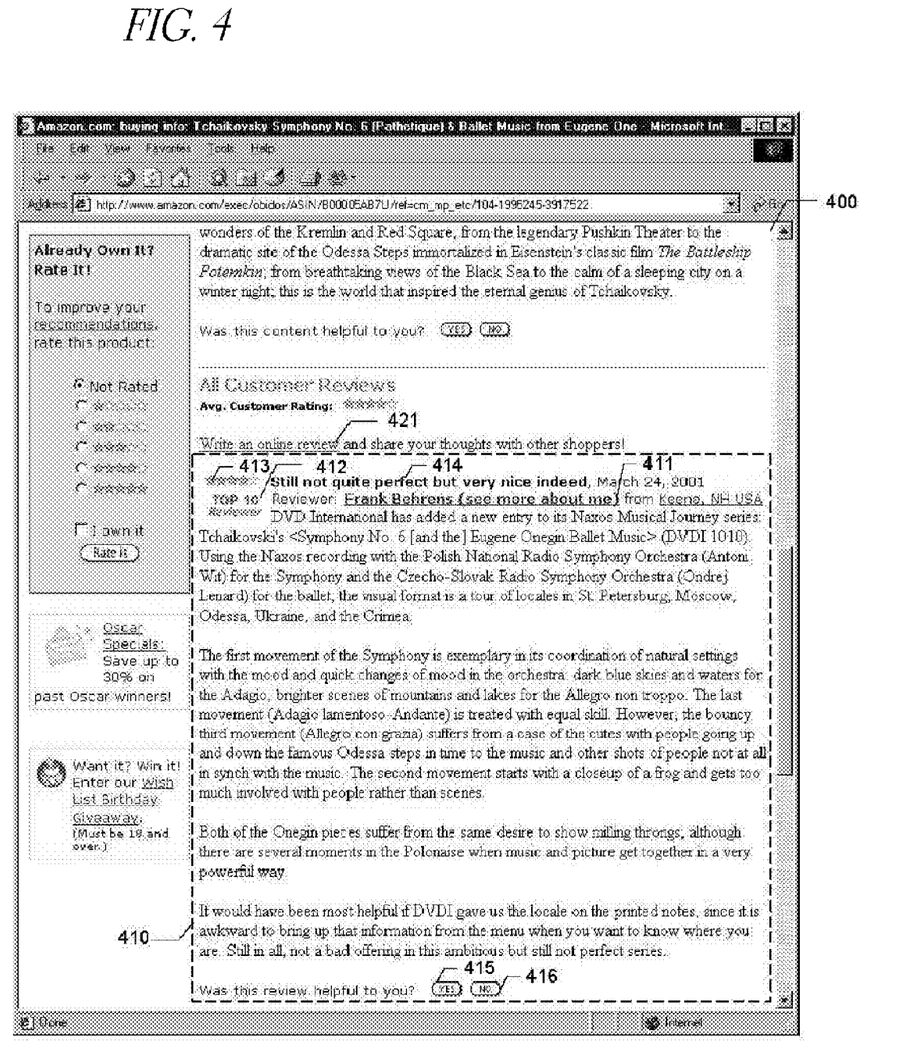
FIG. 4 is a display diagram showing a typical display presented by the facility containing detailed information about an item.

FIG. 4 is a display diagram showing a typical display presented by the facility containing detailed information about an item. In this case, the item is the Tchaikosvky Symphony No. 6 DVD whose review is shown in FIG. 3. The display 400 shown in FIG. 4 is displayed in response to the selection of link 322 shown in FIG. 3. In addition to other information about the item, the display includes a list of reviews submitted for the item. These include review 413 submitted by the reviewer Frank Behrens. The review 410 includes the reviewer's name 411, which is a link to the display shown in FIG. 3; a graphical indication 412 for the current rank of the reviewer; the item grade 413 assigned to the item as part of the review; the review title 414; the text of the review; and voting buttons 415 and 416. A user that is undecided about buying this item may read review 410. Based upon various aspects of the review, the user may either find the review helpful in deciding whether to purchase the item or unhelpful in deciding whether to purchase the item. Such a user may select button 415 if the review was helpful, or button 416 if the review was not helpful. In some embodiments, such votes are the basis on which the facility scores and ranks this reviewer. The display further includes a link 421 that the user may select to submit his or her own review of the Tchaikosvky Symphony No. 6 DVD item.

Figure 5:
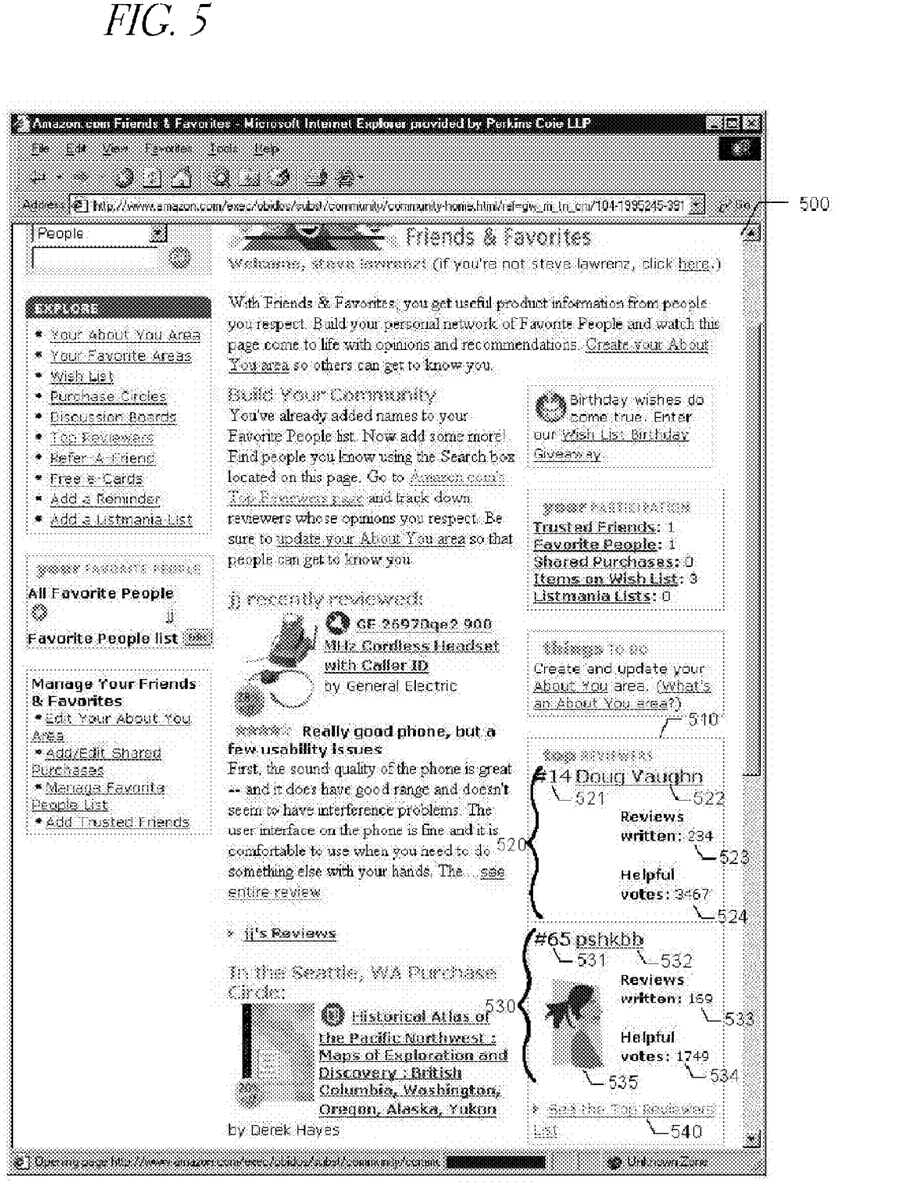
FIG. 5 is a display diagram showing a typical display presented by the facility incorporating information about two randomly-selected top-ranked reviewers.

FIG. 5 is a display diagram showing a typical display presented by the facility incorporating information about two randomly-selected top-ranked reviewers. The display 500 includes a list 510 of randomly-selected top-ranking reviewers. The list is comprised of one or more entries, such as entries 520 and 530 shown here, which each relate to one randomly-selected top-ranked reviewer. For example, entry 520 relates to reviewer number 14, and includes the reviewer's rank value 521; the reviewer's name 522, which is a link which that the user may select in order to display more information about this reviewer; the number of reviews submitted by this reviewer 523; and the number of positive votes 524 received by this reviewer's reviews. Some entries contain an image of the corresponding reviewer, such as image 535 in entry 530. The display also includes a link 540 to the top reviewer's list shown in FIG. 2.

Figure 7:
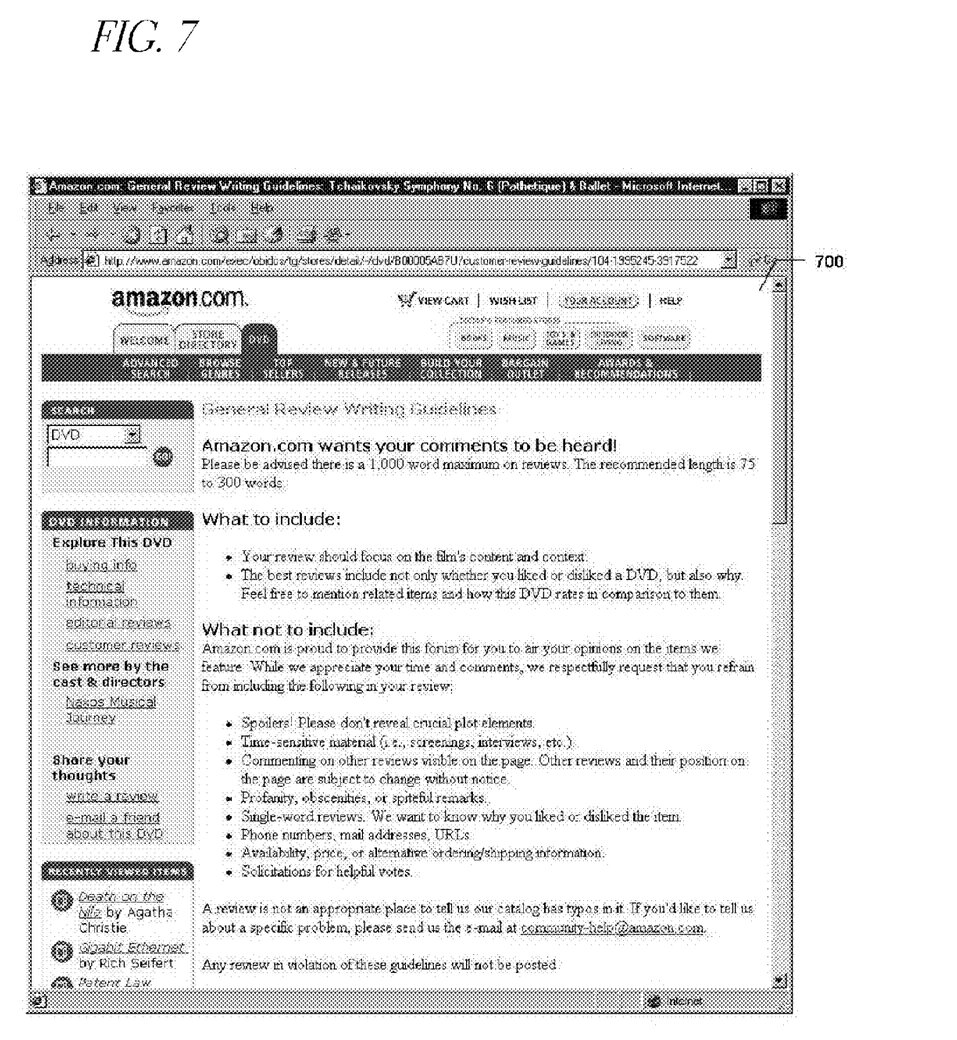
FIG. 7 is a display diagram showing a typical display presented by the facility containing guidelines for preparing an item review.
Figure 8:
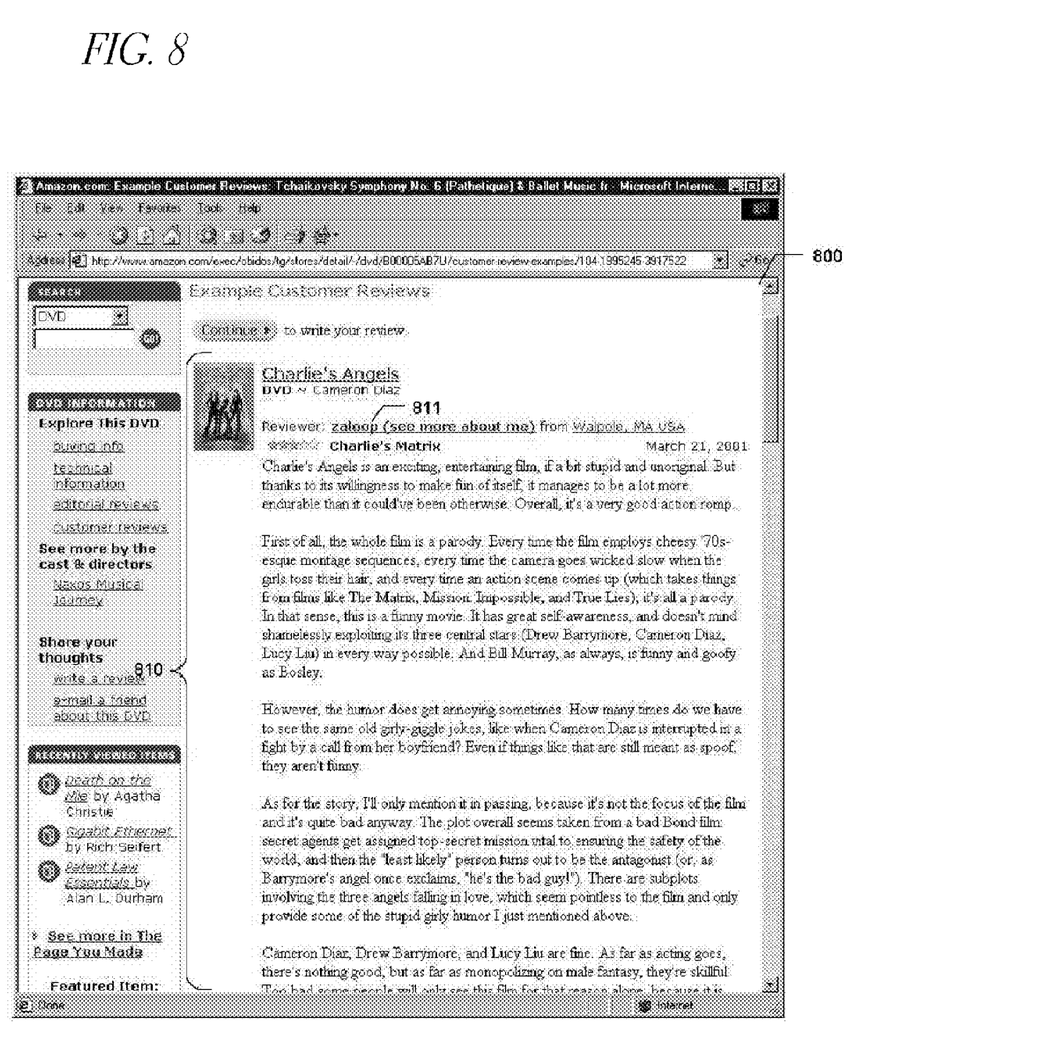
FIG. 8 is a display diagram showing a typical display presented by the facility containing sample reviews.

FIGS. 6-8 show an example of an approach to obtaining an item review submitted by a reviewer. FIG. 6 is a display diagram showing a typical display presented by the facility to enable a user to submit a new review. The user typically selects this display in conjunction with a particular item, for which the user can submit a review. For example, display 600 is displayed in response to the user's selection of link 421 in the display containing detailed information about the Tchaikovsky Symphony No. 6 DVD shown in FIG. 4.

The display includes the identity of the user, which is attributed as the identity of the reviewer. To attribute a different identity to the reviewer, the user can select link 602. The display includes information 603 identifying the item to be reviewed. The display includes a control 604 used by the user to specify a grade or rating for the reviewed item. The display includes field 605 for entering a title for the review. The display includes field 606 for entering the text of the review. The user may select radio button 607 in order to display a reviewer name with the review, which may edited in field 608. Alternatively, the user may select radio button 609 to make the review anonymous and prevent the review from being associated with the reviewer's name. The display also includes field 610 for entering the author's location. Before preparing the review as described, the user may select link 621 in order to display guidelines for preparing the review. The user may also select link 622 in order to display one or more example customer reviews demonstrating compliance with the review guidelines. When the user has assembled the review to be submitted using the above described aspects of the display, the user selects button 611.

FIG. 7 is a display diagram showing a typical display presented by the facility containing guidelines for preparing an item review. The display 700 contains typical guidelines for this activity.

FIG. 8 is a display diagram showing a typical display presented by the facility containing sample reviews. The display 800 includes sample reviews, such as sample review 810. In some embodiments, sample reviews are chosen from among the reviews of top-ranked reviewers, such as from the reviews of the top-ranked 100 reviewers.

Figure 9:
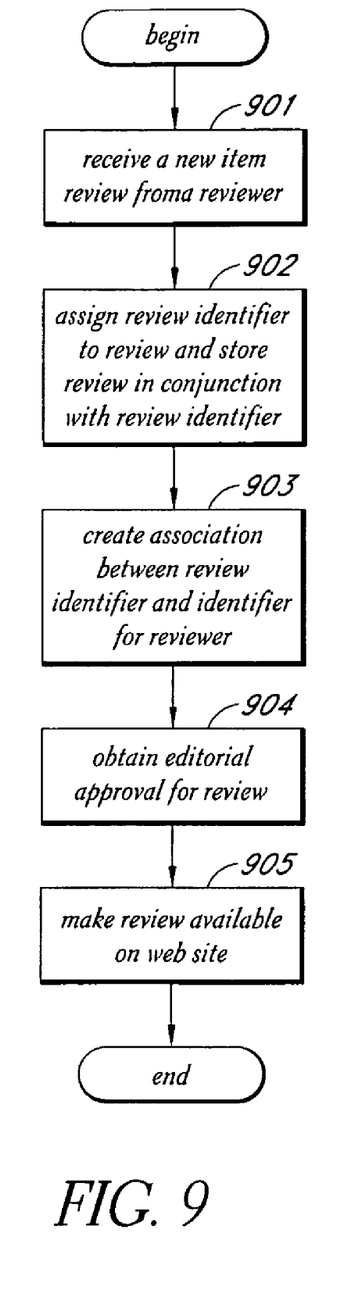
FIG. 9 is a flow diagram showing steps typically performed by the facility in order to process a new item review submitted by a reviewer.

FIG. 9 is a flow diagram showing steps typically performed by the facility in order to process a new item review submitted by a reviewer. In step 901, the facility receives a new item review from a reviewer. Such a new item review may be received in a variety of ways, including receiving it using a web-based form as shown in FIG. 6, receiving it via electronic mail, receiving it in a document uploaded to an FTP server, receiving it in paper form, receiving it in audio form, etc.

In step 902, the facility assigns the review identifier to the review that will be used to identify the review and stores the received review in conjunction with the assigned review identifier. In step 903, the facility creates an association between the assigned review identifier and an identifier for the reviewer. As an example, Table 1 below shows information stored in a data structure, and, in particular, rows stored in a table, in order to create such an association.

TABLE 1

| review identifier | reviewer identifier |
|---|---|
| ... | ... |
| 96335807 | 449603151134 |
| 96335808 | 230651087912 |
| 96335809 | 449603151135 |
| ... | ... |

For example, the first row shown in Table 1 indicates that the item review having review identifier 96335807 was submitted by the reviewer having reviewer identifier 449603151134.

In step 904, the facility obtains editorial approval for the review. As an example, the facility may in step 904 add the review or its review identifier to a queue of new reviews to be subjected to a manual editorial review process. Step 904 is optional, and may be applied selectively, such as to reviews submitted by reviewers that have a reviewer score below a certain threshold, or a reviewer rank value above a certain threshold. Alternatively, the new review may be added to such a queue at different points depending upon the score or rank of the submitting reviewer.

In step 905, after editorial approval has been received for the review, the facility makes the review available on the web site. This may involve, for example, incorporating the review in a display such as those shown in FIGS. 3, 4, and 8. Again, step 905 may be performed in a manner sensitive to the score and/or rank of the submitting reviewer. After step 905, these steps typically conclude.

Figure 10:
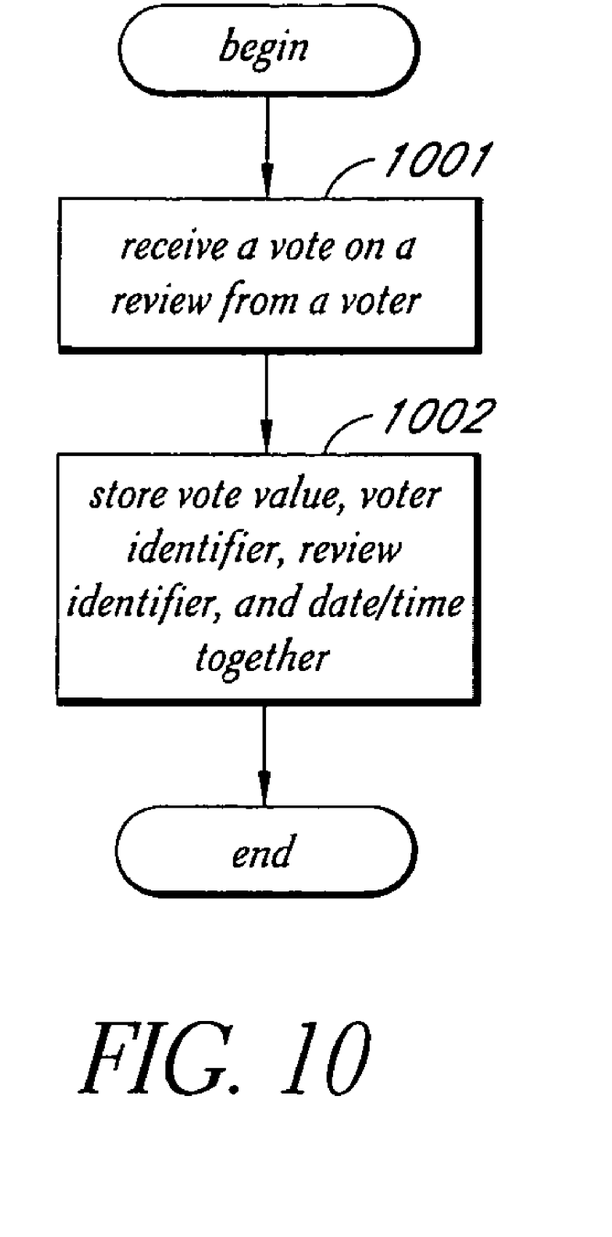
FIG. 10 is a flow diagram showing steps typically performed by the facility in order to process votes received for published item reviews.

FIG. 10 is a flow diagram showing steps typically performed by the facility in order to process votes received for published item reviews. In step 1001, the facility receives a vote on a review from a voter. For example, the facility may receive an indication that a user pressed a button like button 415 shown in FIG. 4 indicating that a review was helpful to the user, or a button like button 416 shown in FIG. 4 indicating that a review was not helpful to the user. Such a vote typically identifies a review to which the vote relates, an identifier identifying the voter, the date and time at which the vote was cast, and the value of the vote, i.e., whether the voter indicated that the review was helpful or not helpful. In step 1002, the facility stores this information together. For example, this information may be stored in an entry of a data structure, such as a row of a table, as shown below in Table 2.

TABLE 2

| review identifier | voter identifier | date/time | helpful |
|---|---|---|---|
| ... | ... | ... | ... |
| 96335807 | 919654002315 | Apr. 11, 2001 16:04:02 | yes |
| 43227116 | 310956681822 | Apr. 11, 2001 16:04:02 | yes |
| 84325510 | 919654002315 | Apr. 11, 2001 16:04:03 | no |
| ... | ... | ... | ... |

For example, it can be seen from the first row shown in Table 2 that a vote on the review having review identifier 96335807, cast by a voter having voter identifier 919654002315, was cast at 16:04:02 on Apr. 11, 2001, and that this vote indicated that the review was helpful. After step 1002, these steps typically conclude.

Figure 11:
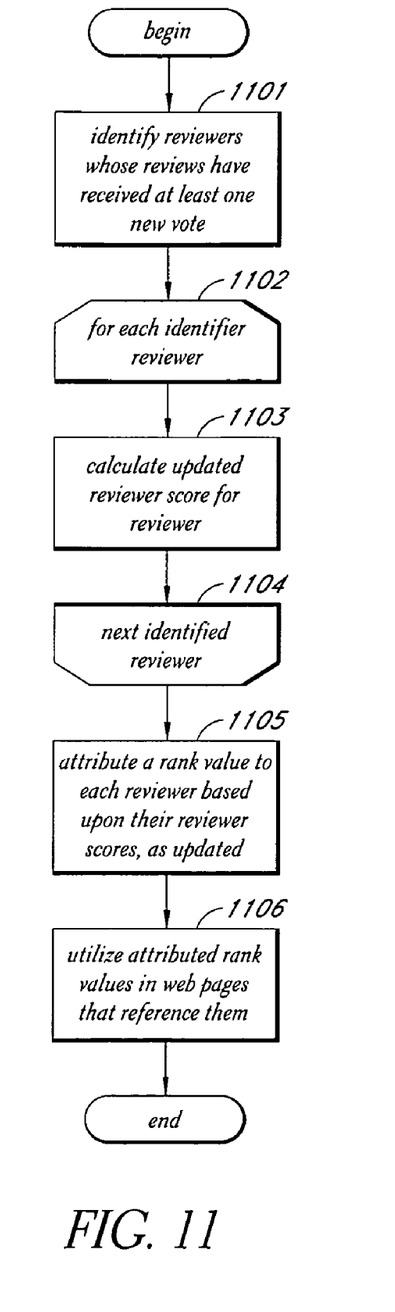
FIG. 11 is a flow diagram showing steps typically performed by the facility to update reviewer scores and rankings.

FIG. 11 is a flow diagram showing steps typically performed by the facility to update reviewer scores and rankings. The facility typically performs these steps periodically, such as once per day. In step 1101, the facility identifies reviewers whose reviews have received at least one new vote. In some embodiments, step 1101 involves selecting from the stored votes those votes cast on the date immediately preceding the current date. The review identifiers in the selected votes are used to identify the reviewer identifiers corresponding to the selected votes.

In steps 1102-1104, the facility loops through each reviewer identified in step 1101 as having received at least one new vote. In step 1103, the facility calculates an updated reviewer score for the current reviewer. The facility is preferably configurable to use a wide variety of different approaches to determining reviewer scores. In one approach, the facility calculates a reviewer score based upon scores calculated for each review of the reviewer. In accordance with this approach, for each review, the facility applies formula (1) below.

$$\text{Score}_{review} = 2(A+B+C) - (D+E) \tag{1}$$

where A is the number of reviews submitted by the author for which at least 3 positive indications were received, B is the number of reviews submitted by the author for which at least 10 positive indications were received, C is the number of reviews submitted by the author that were the first reviews submitted for the corresponding item and for which at least 3 positive indications were received, D is the number of reviews submitted by the author for which at least 3 more negative indications than positive indications were received, and E is the number of reviews submitted by the author for which at least 10 more negative indications than positive indications were received.

In some embodiments, the facility excludes from values A through E any votes that (1) were subsequent to the first vote cast by the same voter on the same review, or (2) were subsequent to the fifth vote by the same voter on any review by the same reviewer. Various other approaches to calculating a score for a review may also be employed by the facility, such as those in which fewer or more factors are considered, or such factors are weighted differently. Additional factors that various embodiments may consider includes such factors as whether the review is the first review submitted for a particular item, and the number of orders that have been placed for an item by a customer to which the review has been displayed.

The score for a reviewer is generated by summing the scores of the reviewer's reviews as shown below in formula (2).

$$\text{Score}_{reviewer} = \sum_{reviewer's\ reviews} \text{Score}_{review} \tag{2}$$

In various embodiments, a reviewer's score may be determined by combining the scores for the reviewer's reviews in a variety of other ways.

After step 1103, the facility continues in step 1104. In step 1104, if additional identified reviewers remain for processing, the facility continues in step 1102 to process the next identified reviewer, else the facility continues in step 1105. In step 1105, the facility attributes a rank value to each reviewer based upon their reviewers scores, as updated. In step 1106, the facility proceeds to utilize the reviewer rank values attributed in step 1105 in any web pages of the web's web site that reference these rank values. This may involve, for example, utilizing the attributed reviewer rank values in a display such as those shown in FIGS. 2-5. After step 1106, these steps typically conclude.

It will be understood by those skilled in the art that the above-described facility could be adapted or extended in various ways. For example, the facility may be operated by others besides web merchants. A variety of different types of rewards may be offered to reviewers submitting useful reviews. The usefulness of reviews may be discerned in a variety of different ways. While the foregoing description makes reference to preferred embodiments, the scope of the invention is defined solely by the claims that follow and the elements recited therein.

What is claimed is:

1. A method in a computer system for evaluating a creator of item reviews, comprising:
    causing the display of one or more item reviews submitted by the creator to a plurality of viewers;
    soliciting, from the viewers to whom an item review is displayed, an indication of whether the review is helpful;
    receiving and storing any solicited indication provided by the viewers to whom item reviews are displayed, each indication being either positive or negative; and
    applying, by said computer system, a formula to obtain a score for the creator based upon the stored indications that considers, for each review submitted by the creator, the number of viewers to whom the review was displayed that subsequently ordered the item identified by the review.

2. The method of claim 1, wherein the applied formula utilizes the following:
    the number of reviews submitted by the creator for which at least a first number of helpful indications were received;
    the number of reviews submitted by the creator for which at least a second number of helpful indications were received, the first number different than the second number; and
    the number of reviews submitted by the creator that were the first reviews submitted for the corresponding item and for which at least a third number of helpful indications were received.

3. The method of claim 1, wherein the applied formula further utilizes the following:
    the number of reviews submitted by the creator for which the number of unhelpful indications exceeds the number of unhelpful indications by a first specified amount; and
    the number of reviews submitted by the creator for which the number of unhelpful indications exceeds the number of unhelpful indications by a second specified amount, the second specified amount different than the first specified amount.

4. The method of claim 1, wherein the formula is based at least in part on the number of reviews submitted by the creator that were first reviews submitted for corresponding items.

5. The method of claim 1, the method further comprising using the creator score to determine whether at least one review submitted by the creator is to be subject to a manual editorial review.

6. A computer-readable medium whose contents cause a computing system to perform a method for evaluating an creator of item reviews, the method comprising:
    at least partly causing the display of one or more item reviews submitted by the creator to a plurality of viewers;

soliciting, from the viewers to whom an item review is displayed, an indication of whether the review is helpful; and receiving and storing any solicited indication provided by the viewers to whom item reviews are displayed, each indication being either positive or negative; and applying a formula to obtain a score for the creator based upon the stored indications that considers, for each review submitted by the creator, the number of viewers to whom the review was displayed that subsequently ordered the item identified by the review.

7. The method of claim 6, wherein the applied formula utilizes the following:

the number of reviews submitted by the creator for which at least a first number of helpful indications were received;

the number of reviews submitted by the creator for which at least a second number of helpful indications were received; and the number of reviews submitted by the creator that were the first reviews submitted for corresponding items and for which at least a third number of helpful indications were received.

8. The method of claim 6, wherein the applied formula further utilizes the following:

the number of reviews submitted by the creator for which the number of unhelpful indications exceeds the number of unhelpful indications by a first specified amount; and the number of reviews submitted by the creator for which the number of unhelpful indications exceeds the number of unhelpful indications by a second specified amount.

9. The computer-readable medium as defined in claim 6, wherein the formula is based at least in part on the number of reviews submitted by the creator that were first reviews submitted for corresponding items.

10. A method in a computer system for evaluating an creator of item reviews, comprising:

at least partly causing the display of a first number of reviews submitted by the creator to a plurality of viewers, the first number of reviews including one or more reviews;

soliciting, from the viewers to whom one or more item reviews from the first number of reviews are displayed, an indication of whether the one or more item reviews are helpful;

receiving and storing responses to the solicitations; and applying, by said computer system, a formula to obtain a score for the creator based upon the stored responses that considers, for each review in the first number of reviews submitted by the creator, the number of viewers to whom the review was displayed that subsequently ordered the item identified by the review.

11. The method of claim 10, wherein the applied formula utilizes the following:

the number of reviews submitted by the creator for which at least a first number of helpful indications were received;

the number of reviews submitted by the creator for which at least a second number of helpful indications were received; and the number of reviews submitted by the creator that were the first reviews submitted for the corresponding item and for which at least a third number of helpful indications were received.

12. The method of claim 10, wherein the applied formula further utilizes the following:

the number of reviews submitted by the creator for which the number of unhelpful indications exceeds the number of unhelpful indications by a first specified amount; and the number of reviews submitted by the creator for which the number of unhelpful indications exceeds the number of unhelpful indications by a second specified amount.

13. The method of claim 10, wherein the formula is based at least in part on the number of reviews submitted by the creator that were first reviews submitted for corresponding items.

14. The method of claim 10, the method further comprising using the creator score to determine whether at least one review submitted by the creator is to be subject to a manual editorial review.

15. The method of claim 10, the method further comprising using the creator score to determine the positioning of at least one review submitted by the creator in a queue of new reviews.

16. The method of claim 10, the method further comprising using the creator score in incorporating at least one review in a user interface displayed to one or more viewers.

17. The method of claim 10, the method further comprising excluding at least one solicitation response from a first viewer regarding a first review from the creator in obtaining the score where the at least one solicitation response is subsequent to a first solicitation response by the first viewer for the first review.

18. The method of claim 10, the method further comprising excluding at least one solicitation response from a first viewer regarding a first review from the creator in obtaining the score where the first viewer has provided more than a first number of solicitation responses with respect to the reviews by the creator in the first number of reviews.

19. A computer-readable medium whose contents cause a computing system to perform a method for evaluating an creator of item reviews, the method comprising:

at least partly causing the display of a first number of reviews submitted by the creator to a plurality of viewers, the first number of reviews including one or more reviews;

soliciting, from the viewers to whom one or more item reviews from the first number of reviews are displayed, an indication of whether the one or more item reviews are helpful;

receiving and storing responses to the solicitations; and applying a formula to obtain a score for the creator based upon the stored responses that considers, for each review in the first number of reviews submitted by the creator, the number of viewers to whom the review was displayed that subsequently ordered the item identified by the review.

20. The method of claim 19, wherein the applied formula utilizes the following:

the number of reviews submitted by the creator for which at least a first number of helpful indications were received;

the number of reviews submitted by the creator for which at least a second number of helpful indications were received; and the number of reviews submitted by the creator that were the first reviews submitted for the corresponding item and for which at least a third number of helpful indications were received.

21. The method of claim 19, wherein the applied formula further utilizes the following:

the number of reviews submitted by the creator for which the number of unhelpful indications exceeds the number of unhelpful indications by a first specified amount; and the number of reviews submitted by the creator for which the number of unhelpful indications exceeds the number of unhelpful indications by a second specified amount.

22. The computer-readable medium as defined in claim 19, wherein the formula is based at least in part on the number of reviews submitted by the creator that were first reviews submitted for corresponding items.

23. The computer-readable medium as defined in claim 19, the method further comprising using the creator score to determine whether at least one review submitted by the creator is to be subject to a manual editorial review.

24. The computer-readable medium as defined in claim 19, the method further comprising using the creator score to determine the positioning of at least one review submitted by the creator in a queue of new reviews.

25. The computer-readable medium as defined in claim 19, the method further comprising using the creator score in incorporating at least one review in a user interface displayed to one or more viewers.

26. The computer-readable medium as defined in claim 19, the method further comprising excluding at least one solicitation response from a first viewer regarding a first review from the creator in obtaining the score where the at least one solicitation response is subsequent to a first solicitation response by the first viewer for the first review.

27. The computer-readable medium as defined in claim 19, the method further comprising excluding at least one solicitation response from a first viewer regarding a first review from the creator in obtaining the score where the first viewer has provided more than a first number of solicitation responses with respect to the reviews in the first number of reviews.

* * * * *